US007752181B2

(12) United States Patent
Klein et al.

(10) Patent No.: US 7,752,181 B2
(45) Date of Patent: Jul. 6, 2010

(54) SYSTEM AND METHOD FOR PERFORMING A DATA UNIQUENESS CHECK IN A SORTED DATA SET

(75) Inventors: Jonathan Klein, Redwood City, CA (US); Bipul Sinha, Foster City, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 381 days.

(21) Appl. No.: 10/984,113

(22) Filed: Nov. 8, 2004

(65) Prior Publication Data

US 2006/0122963 A1 Jun. 8, 2006

(51) Int. Cl.
*G06F 17/30* (2006.01)
(52) U.S. Cl. ...................................................... 707/692
(58) Field of Classification Search .................. 707/100
See application file for complete search history.

(56) References Cited

U.S. PATENT DOCUMENTS

| | | | | | |
|---|---|---|---|---|---|
| 4,819,156 | A | * | 4/1989 | DeLorme et al. | 714/15 |
| 5,469,562 | A | * | 11/1995 | Saether | 714/20 |
| 5,481,699 | A | * | 1/1996 | Saether | 714/15 |
| 5,511,190 | A | * | 4/1996 | Sharma et al. | 707/1 |
| 5,706,495 | A | * | 1/1998 | Chadha et al. | 707/2 |
| 5,742,806 | A | * | 4/1998 | Reiner et al. | 707/3 |
| 5,892,900 | A | * | 4/1999 | Ginter et al. | 726/26 |
| 5,918,225 | A | * | 6/1999 | White et al. | 707/3 |
| 6,052,698 | A | * | 4/2000 | Bennett et al. | 707/205 |
| 6,105,033 | A | * | 8/2000 | Levine | 707/101 |
| 6,523,036 | B1 | * | 2/2003 | Hickman et al. | 707/10 |
| 6,560,774 | B1 | * | 5/2003 | Gordon et al. | 717/146 |
| 6,799,200 | B1 | * | 9/2004 | Blackmore et al. | 709/212 |
| 6,834,279 | B1 | * | 12/2004 | Chiang | 707/2 |
| 6,868,441 | B2 | * | 3/2005 | Greene et al. | 709/220 |
| 6,920,461 | B2 | * | 7/2005 | Hejlsberg et al. | 707/103 R |
| 6,947,956 | B2 | * | 9/2005 | Olstad et al. | 707/200 |
| 6,976,022 | B2 | * | 12/2005 | Vemuri et al. | 707/8 |
| 6,999,980 | B2 | * | 2/2006 | Detlefs et al. | 707/206 |
| 7,017,162 | B2 | * | 3/2006 | Smith et al. | 719/328 |
| 7,082,495 | B2 | * | 7/2006 | DeWhitt et al. | 711/113 |
| 7,089,125 | B2 | * | 8/2006 | Sonderegger | 702/57 |
| 7,089,289 | B1 | * | 8/2006 | Blackmore et al. | 709/212 |

(Continued)

OTHER PUBLICATIONS

"Managing Hash Clusters" from Oracle Database Administrator's Guide, 10g Release 1 (10.1). Dec. 2003.*

(Continued)

*Primary Examiner*—Neveen Abel Jalil
*Assistant Examiner*—Mark Andrew X Radtke
(74) *Attorney, Agent, or Firm*—Townsend and Townsend and Crew LLP (57) ABSTRACT

Embodiments of the present invention include a method for performing a data uniqueness check in a set of sorted data blocks comprising accessing data to be inserted into the set of sorted data blocks, determining a proper data block of the set of sorted data blocks for which the data to be inserted should be located based on a first sorting key. The method further includes examining the proper data block for an existing data entry and if the proper data block is empty, the method further includes inserting the data to be inserted into the proper data block of the set of sorted data blocks.

27 Claims, 9 Drawing Sheets

U.S. PATENT DOCUMENTS

| | | | |
|---|---|---|---|
| 7,103,588 B2* | 9/2006 | Beck et al. | 707/2 |
| 7,117,504 B2* | 10/2006 | Smith et al. | 719/328 |
| 7,150,006 B2* | 12/2006 | Bliss et al. | 717/124 |
| 7,171,655 B2* | 1/2007 | Gordon et al. | 717/146 |
| 7,237,240 B1 | 6/2007 | Chen et al. | 718/100 |
| 7,243,299 B1* | 7/2007 | Rubin et al. | 715/209 |
| 7,496,829 B2 | 2/2009 | Rubin et al. | 715/203 |
| 7,546,602 B2 | 6/2009 | Hejlsberg et al. | 719/313 |
| 2003/0154468 A1* | 8/2003 | Gordon et al. | 717/143 |
| 2003/0167277 A1* | 9/2003 | Hejlsberg et al. | 707/102 |
| 2003/0167356 A1* | 9/2003 | Smith et al. | 709/328 |
| 2004/0014209 A1* | 1/2004 | Lassar et al. | 435/366 |
| 2004/0039759 A1* | 2/2004 | Detlefs et al. | 707/206 |
| 2004/0054643 A1* | 3/2004 | Vemuri et al. | 707/1 |
| 2004/0225673 A1* | 11/2004 | Beck et al. | 707/102 |
| 2005/0034056 A1* | 2/2005 | Rubin et al. | 715/500 |
| 2005/0055376 A1* | 3/2005 | Xie et al. | 707/104.1 |
| 2005/0075996 A1* | 4/2005 | Dettinger et al. | 707/1 |
| 2005/0086384 A1* | 4/2005 | Ernst | 709/248 |
| 2005/0097399 A1* | 5/2005 | Bliss et al. | 714/38 |
| 2005/0138013 A1* | 6/2005 | Walker et al. | 707/3 |
| 2005/0262110 A1* | 11/2005 | Gu et al. | 707/100 |
| 2006/0080285 A1* | 4/2006 | Chowdhuri | 707/3 |
| 2006/0161740 A1* | 7/2006 | Kottapalli et al. | 711/152 |

OTHER PUBLICATIONS

Detlefs, D.L.; Herlihy, M.P.; Wing, J.M., "Inheritance of synchronization and recovery properties in Avalon/C++," Computer, vol. 21, No. 12, pp. 57-69, Dec. 1988 URL: http://ieeexplore.ieee.org/stamp/stamp.jsp?arnumber=16189&isnumber=579.*

Sullivan, M.; Chillarege, R., "Software defects and their impact on system availability—a study of field failures in operating systems," Fault-Tolerant Computing, 1991. FTCS-21. Digest of Papers., Twenty-First International Symposium , vol. No. pp. 2-9, Jun. 25-27, 1991 URL: http://ieeexplore.ieee.org/stamp/stamp.jsp?arnumber=146625&isnumber=3916.*

* cited by examiner

SYSTEM AND METHOD FOR PERFORMING A DATA UNIQUENESS CHECK IN A SORTED DATA SET

TECHNICAL FIELD

The field of the invention relates to computer system data storage management. More specifically, embodiments of the invention relate to index structures to improve data access in a database.

BACKGROUND ART

Relational databases can be effective for a wide variety of transaction processing applications. They are also particularly advantageous for their ability to support non-procedural data access for ad hoc queries and set-oriented (multiple row at a time) processing and eliminating the need for applications to navigate physical record structures on disk.

However, unlike other database management system approaches, relational database technology (including the SQL data access language) does not broadly support direct access to data based on a physical sequence of records (rows), nor does it broadly support successive accesses to a record (row) based on a "current position" in a table of rows. Instead, accessing a single row of a large table (to update or delete it for example) generally requires that the database management system process an index to locate the row of interest based on query criteria. This index-based access requires reading and processing (usually multiple) blocks containing index nodes to locate pointers to rows of interest, which is followed by a read request to bring the block containing the row into memory.

Positional access is commonly required by high-performance applications that require data access in a more structured, ordered fashion. For example, in processing queues of various kinds, a "first-in/last-out" sequence of data access is required. A software application that is monitoring real-time events might want to process such events in "first-in/first-out" sequence. Other applications might require that data be processed in sequence based on the value of one or more attributes of the data (e.g., a running total might be computed in "line item number" order). Designers of such applications often require predictable high performance, and must generally avoid sorts, and would prefer to use mechanisms other than indexes to locate data (especially sequentially valued rows). Locating data by indexes can be expensive (resource wise) because many times multiple indexes must be accessed to locate the data of interest. Similarly, they would choose where possible to avoid designing applications that obtain, save and use physical row pointers at the programming level, especially where the database system cannot guarantee that such row pointers are reliable over time.

SUMMARY OF THE INVENTION

A system and method that provides efficient first-in/first out processing of data are improvements over the art. Accordingly, a system and method for performing data uniqueness checking in a sorted data set are presented. Embodiments of the present invention include a computer implemented method for performing a data uniqueness check in a set of sorted data blocks comprising: accessing data to be inserted into the set of sorted data blocks, determining a proper data block from the set of data blocks storing the sorted data for which the data to be inserted should be located based on a sorting key. The method further includes examining the proper data block for an existing data entry and if the proper data block is empty, the method further includes inserting the data be inserted into the proper data block from the set of data blocks storing the sorted data.

In another embodiment of the invention, if the proper data block contains an existing entry (i.e. row or tuple containing some sorting key), the method further includes determining whether the proper data row or tuple is pinned or unpinned. In another embodiment of the invention, the method further includes determining the proper data row or tuple is unpinned and thereby generates a uniqueness error indicating the data to be inserted is a duplicate of the existing entry of the set of sorted data blocks.

In another embodiment of the invention, the method further includes determining the proper data row or tuple that is pinned and determining if the proper data row or tuple is either committed or rolled back. In this embodiment of the invention, if it is determined that the proper data row or tuple is committed, the method further includes generating a uniqueness error indicating that the data to be entered is a duplicate of the existing entry of the set of sorted data blocks. In another embodiment of the invention, if it is determined that the proper data row or tuple, which was originally pinned and active but after checking on the status of the pin is determined that the pin holder has in fact rolled back the operation, the method further includes inserting the data to be inserted into the proper data block of the set of sorted data blocks.

In another embodiment of the invention, the method further includes determining the proper data row or tuple is associated with deleted data, accessing an undo log pointer associated with the deleted data, accessing a data block pointed to by the undo log pointer and comprising said deleted data and determining a value of said deleted data. In this embodiment of the invention, if it is determined that the value of the deleted data is different than a value of the data to be inserted, the method further includes inserting the data to be inserted into the proper location of the set of sorted data blocks. In one embodiment of the invention, the entire undo chain is read for that row to determine that a match isn't found.

In another embodiment of the invention, if it is determined that the value of the deleted data is equal to a value of the data to be inserted, the method further includes determining if the data comprises the first sorting key. If the data comprises the first sorting key, the method further includes generating a uniqueness error indicating that the data to be inserted is a duplicate entry of the deleted data.

A system for performing data uniqueness checking in a set of sorted data blocks is also presented.

BRIEF DESCRIPTION OF THE DRAWINGS

The above and other objects and advantages of the present invention will be more readily appreciated from the following detailed description when read in conjunction with the accompanying drawings, wherein.

DETAILED DESCRIPTION OF THE INVENTION

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents, which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions, which follow, are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence at steps or instructions leading to a desired result. The steps are those requiring physical manipulations of physical quantities. Usually, though not necessarily, these quantities are capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention (e.g., process 500, 600, 700 and 800), discussions utilizing terms such as accessing, examining, determining, inserting, generating, waiting, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A System And Method For Performing A Data Uniqueness Check In a Sorted Data Set Embodiments of the present invention pertain to transaction undo log based unique key maintenance. In applications where a key is known to exist in a block or, set of blocks, uniqueness check can be implemented using transaction undo log. Embodiments of the present invention include pinning the block where the key would exist, and if the key is found in the block, and it is not pinned, then invoke, e.g., throw a uniqueness check error.

In another embodiment of the invention, if the key is found and it is pinned by a transaction, then the process waits for the transaction to finish. If this transaction leaves the key in the block, then the process throws a uniqueness check error. If this transaction does not leave the key in the block, then the process goes ahead and inserts the key. In one embodiment of the invention, if the key is not found in the block at all and there are no deleted rows, then walking the undo log is not needed. It is only for the deleted rows that walking the undo log chains may be needed. In another embodiment of the invention, each deleted row represents a single undo log chan. If the key is not found in the block, then the process walks the undo log chain of just the active transactions in the block that has deleted a row. If the key is not found in any of the undo chains, then the key is inserted; otherwise, if an undo record containing the key is found in the undo log chain of any transactions and the key is found to match the key being inserted, then the process waits for this transaction to finish. If the transaction commits, the key is inserted in the block; otherwise, the uniqueness check error is invoked. In another embodiment of the invention, after waiting, the operation is tried again since the status of the block might have changed between the time the checks were performed and the time waited.

It is appreciated that embodiments of the present invention are well suited to perform a uniqueness check for hash structures, range structures and a mix of range and hash structures. However, the present invention may be used to perform a uniqueness check for any sorted data structure.

Figure 1:
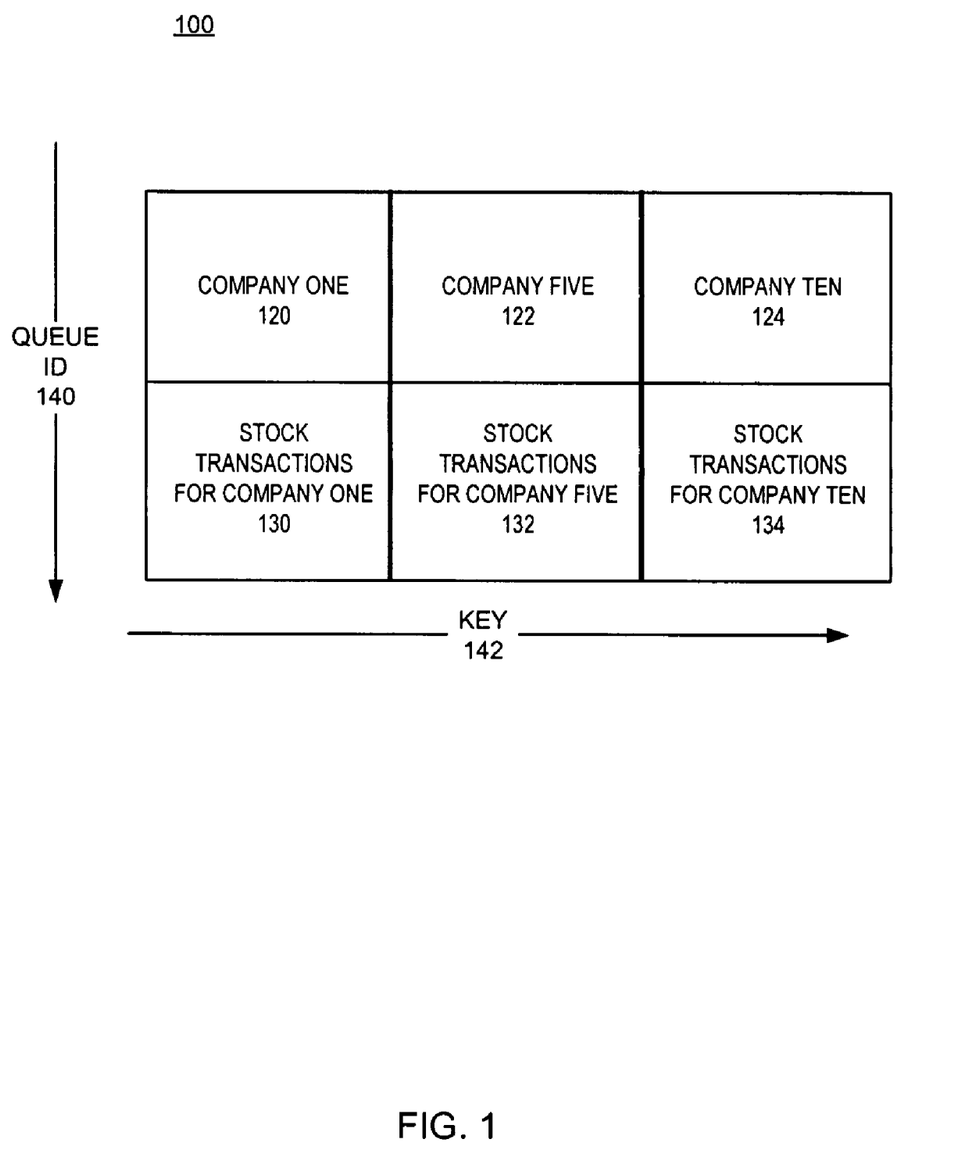
FIG. 1 is a block diagram of an exemplary set of sorted data blocks sorted according to a queue identification (ID) and a key in accordance with embodiments of the present invention.

FIG. 1 is a memory block diagram of an exemplary set of sorted data blocks 100 sorted according to a queue ID 140 and a key 142 in accordance with embodiments of the present invention. It is appreciated that the set of sorted data blocks 100 can be a sorted hash cluster, a sorted range structure, a hybrid structure comprising both hash structures and range structures, or any other set of sorted data in accordance with embodiments of the present invention.

A set of sorted data is a set of data that is stored on disk in a sorted order according to parameters established by, for example a user. The set of sorted data can be a set of data blocks of a database, for example. The set of sorted data blocks can be sorted according to a set of sort parameters. The blocks of sorted data blocks 100 are sorted according to a queue identification (ID) 140 on the vertical axis and by a key 142 on the horizontal axis.

For purposes of illustration, the key 142 is defined as the company name and the queue ID 140 is defined as the execution order for stock transactions of the different companies. It is appreciated that the queue ID 140 and the key 142 can be defined as any sort parameter for the different blocks of data. The key 142 sorts the horizontal blocks in the order of Company one 120, Company five 122 and company ten 124. The queue ID 140 sorts the vertical blocks according to an execution data of stock transactions for the companies listed across the horizontal axis.

For example, the stock transactions for Company one 130 are sorted in order below Company one 120 according to the execution date of the trade. Likewise, the stock transactions for Company five 132 are sorted below Company five 122. Furthermore, the stock transactions for Company ten 134 are sorted below Company ten 124. The important feature of sorting the data in this embodiment is that the data is stored in memory in a sorted order physically on disk.

Embodiments of the present invention take advantage of the sorted physical layout of the data on disk to perform a data uniqueness check when inserting new data into the set of sorted data blocks 100. Specifically, embodiments of the present invention perform data uniqueness checks without using index structures for the data. This significantly reduces the overhead and complexity associated with searching multiple indexes for duplicate data. As a result, embodiments described herein operate faster than the conventional techniques that use indexes. Embodiments of the present invention provide an efficient way to perform a data uniqueness check by examining the sorted data structure on the disk.

Figure 2:
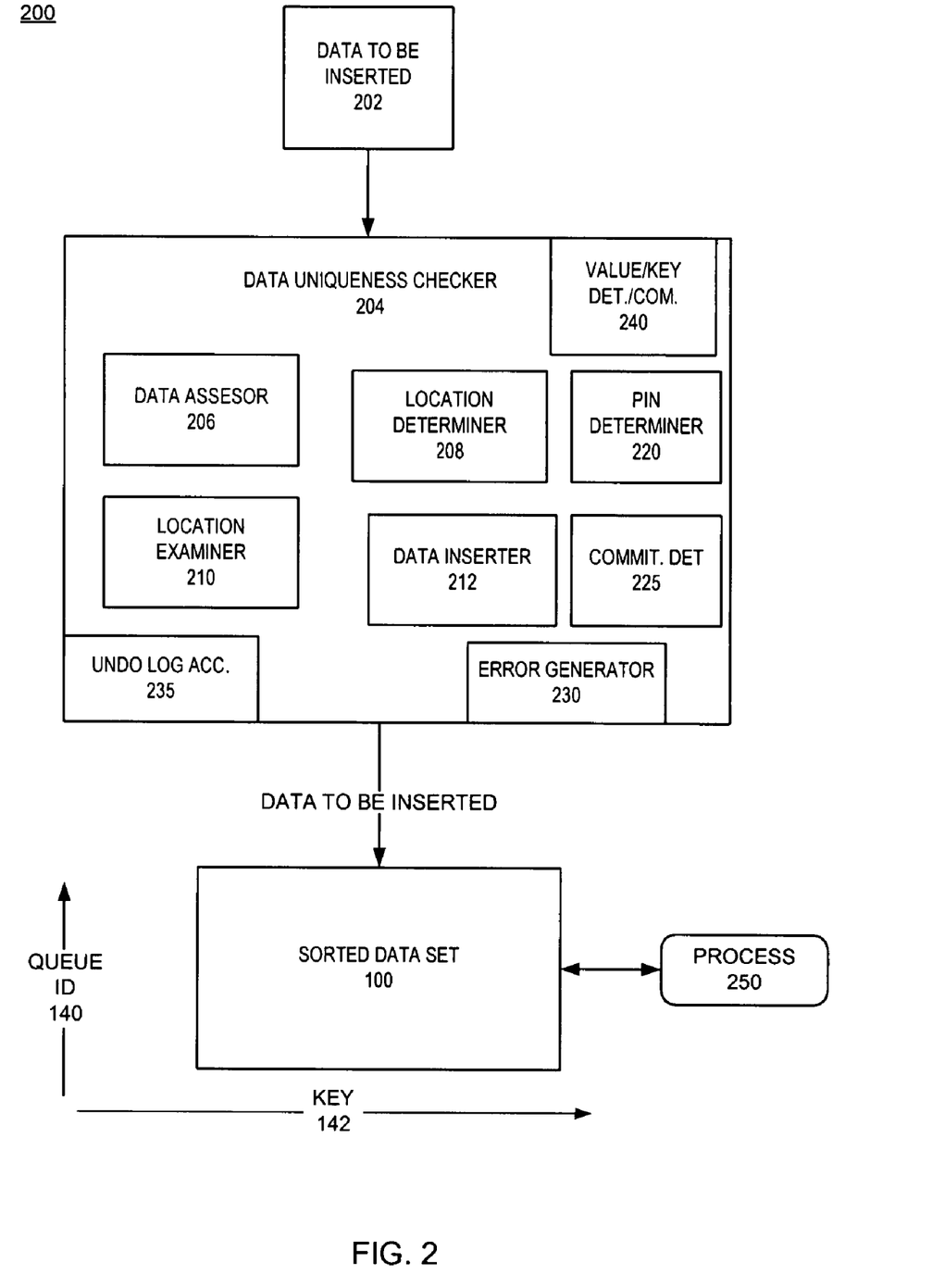
FIG. 2 is a block diagram of an exemplary system for performing a data uniqueness check on a set of sorted data blocks in accordance with embodiments of the present invention.

FIG. 2 is a software block and data flow diagram of an exemplary computer controlled system 200 for performing a data uniqueness check on a set of sorted data blocks 100 in accordance with embodiments of the present invention. Specifically, the data uniqueness checker 204 examines data to be inserted 202 and accesses the sorted data set 100 to determine if the data to be inserted would be a unique entry of the sorted data set 100 or a duplicate entry. The data uniqueness checker 204 comprises a data accessor for accessing the data to be inserted 202. A location determiner 208 determines a proper location for the data to be inserted 202 in the set of sorted data blocks 100.

In one embodiment of the invention, the location determiner 208 determines the proper location by a queue ID 140 and a key 142. A location examiner 210 examines the proper location determined by the location determiner 208 for an existing entry in that location on disk. If the proper location is empty, the data inserter 212 inserts the data into the proper location on disk according to the key 142 and the queue ID 140.

In one embodiment of the invention, if the proper location comprises an existing entry, a lock determiner 220 determines the lock status of the existing data block. The existing data block can be either pinned or unpinned. A block can be pinned when a process 250 is performing operations on the block.

Figure 3:
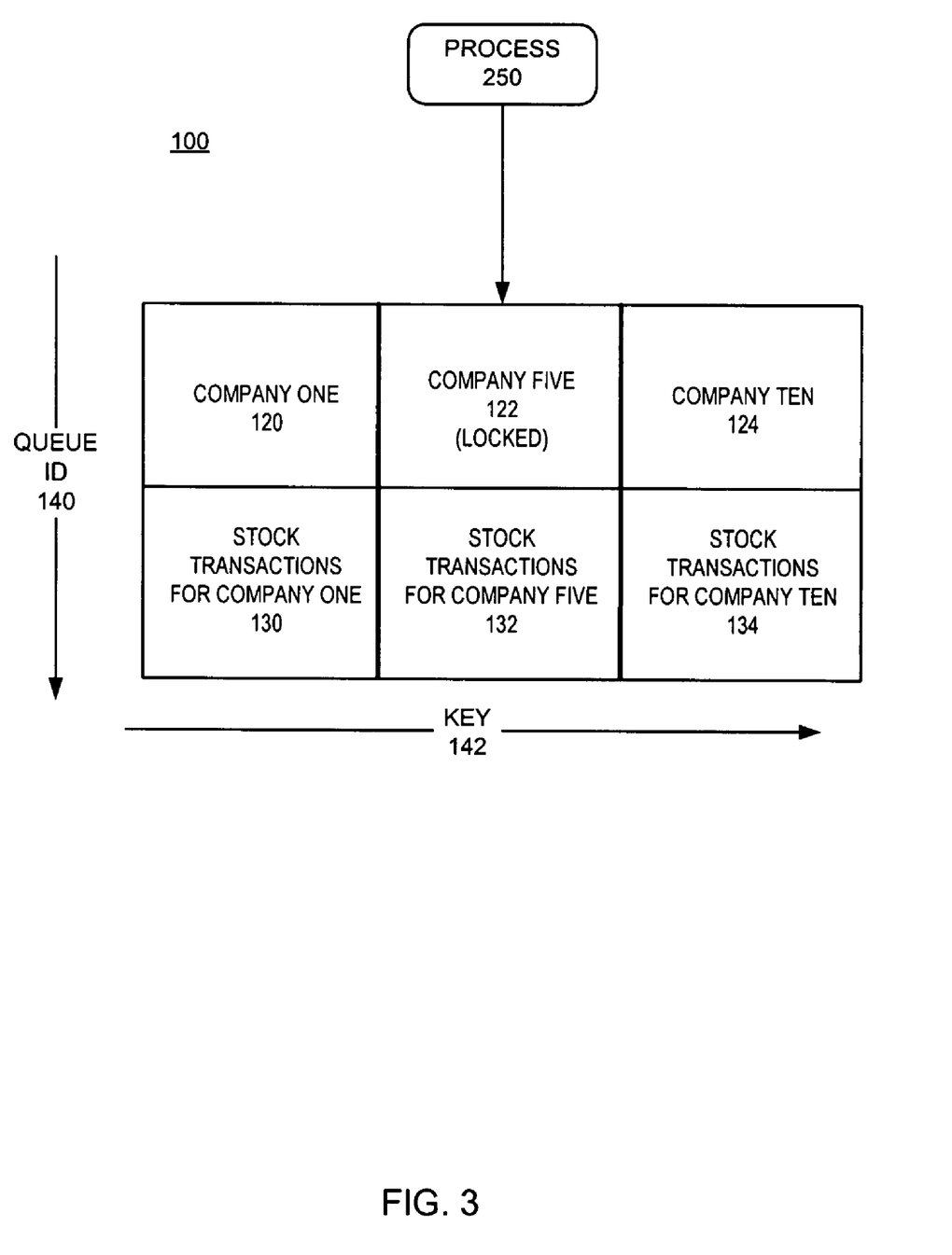
FIG. 3 is a block diagram of an exemplary set of sorted data blocks wherein a data block is pinned by a process in accordance with embodiments of the present invention.

FIG. 3 is an illustration of a set of sorted data blocks wherein one of the data blocks is pinned in accordance with embodiments of the present invention. Company five 122 is pinned because, for example, process 250 is performing an operation on one of the data blocks associated with Company five 122.

Referring back to FIG. 2, if the existing entry in the proper location on disk is not pinned, an error generator 230 generates a uniqueness error indicating that the data to be inserted is a duplicate entry of the existing entry in the proper location on disk. If the existing location is pinned, a commit determiner determines if the existing pinned block is either committed or rolled back.

In another embodiment of the invention, it is determined that an existing entry of a proper location is marked as deleted. In this embodiment of the invention, an undo log accessor accesses an undo log for a pointer to the deleted data. Once the undo log pointer is accessed, the physical location of the deleted data is accessed and a value/key determiner and comparator 240 determines the value of the deleted data and compares the value of the deleted data to the value of the data to be inserted 202.

Figure 4:
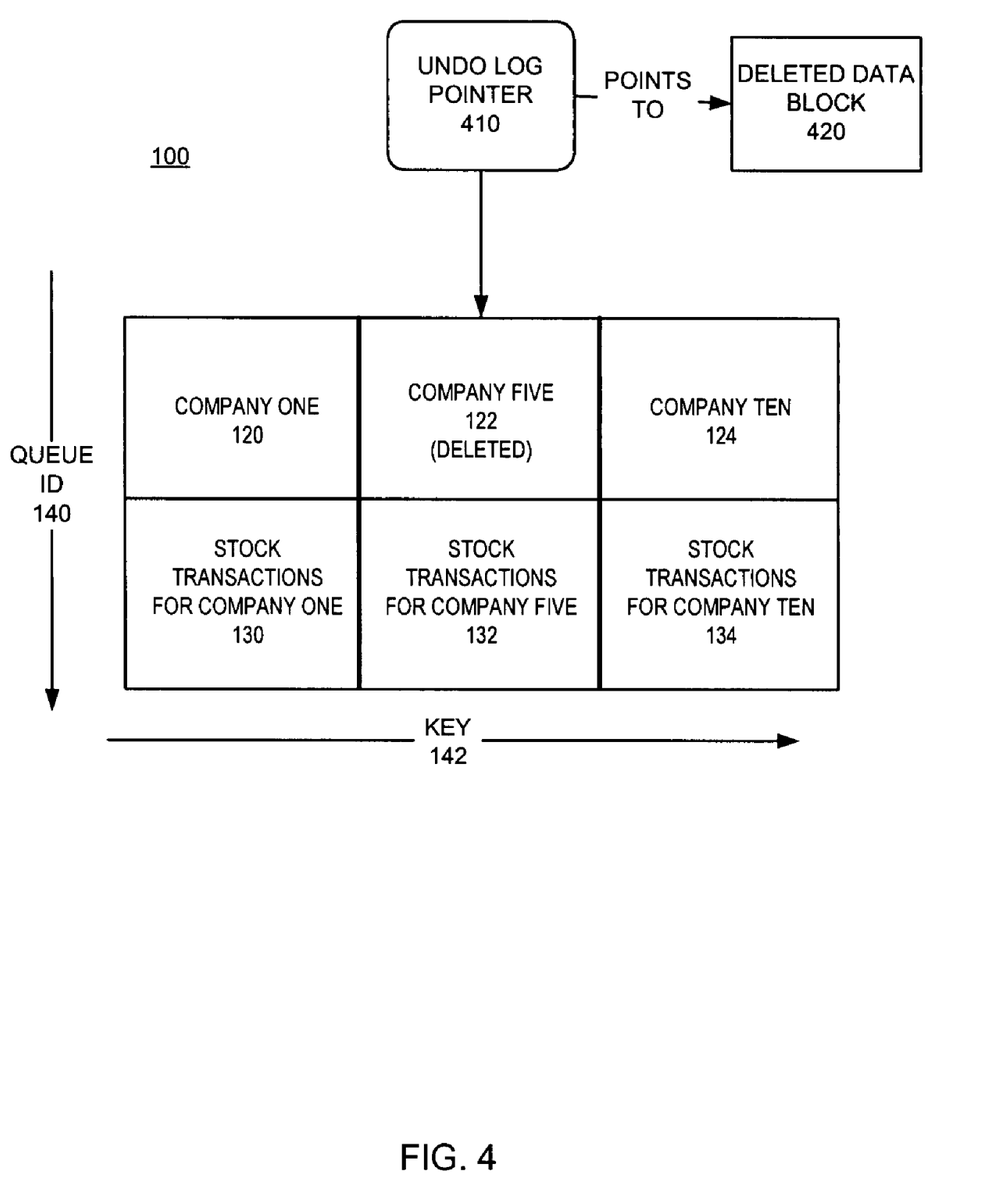
FIG. 4 is a block diagram of an exemplary set of sorted data blocks wherein a block is deleted in accordance with embodiments of the present invention.

FIG. 4 is a memory block diagram of an exemplary set of sorted data blocks wherein a block is deleted in accordance with embodiments of the present invention. When a block is deleted, an undo log pointer 410 points to the deleted data block 420 which is the physical location of the deleted data on the disk.

Figure 5:
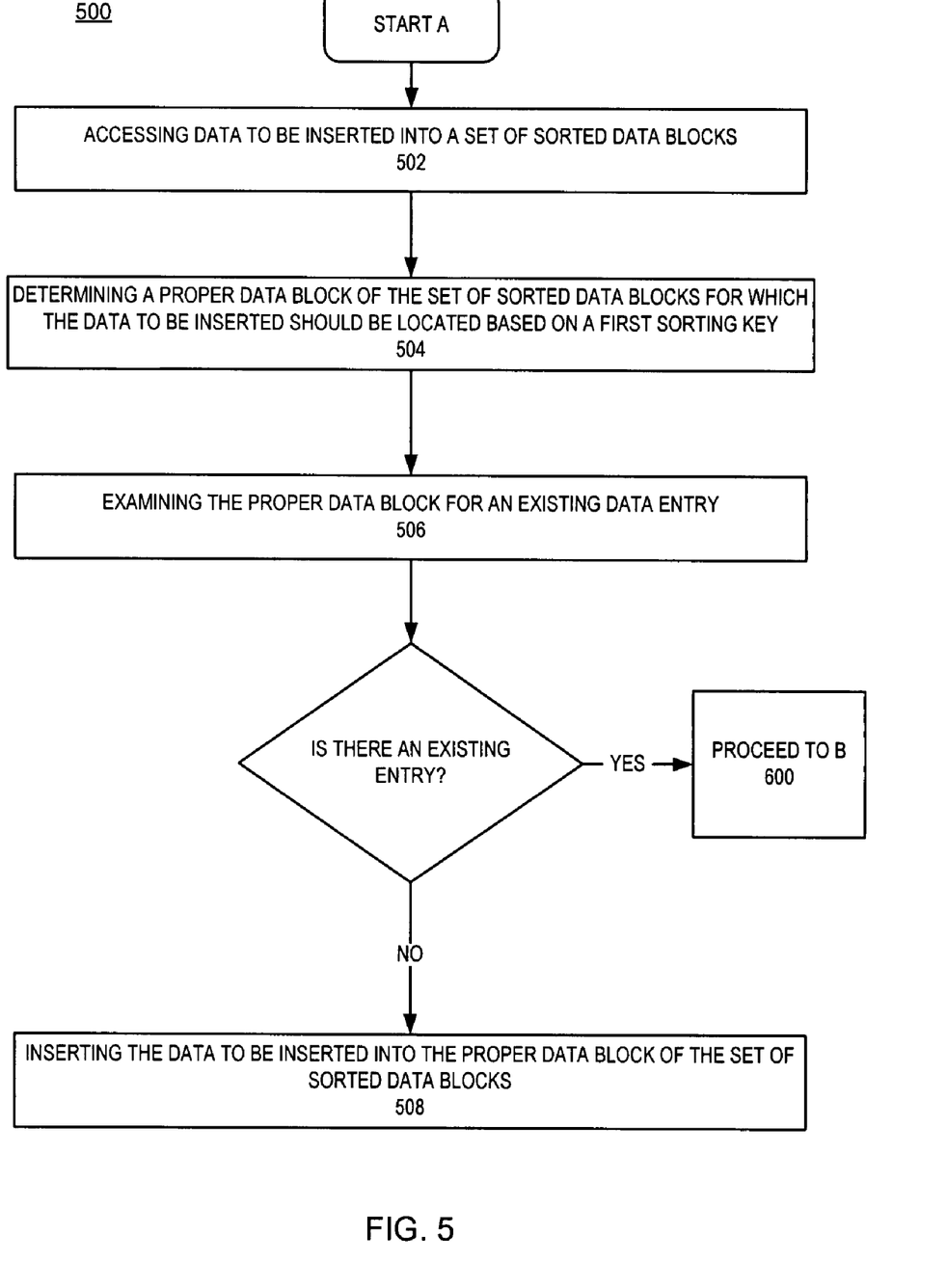
FIG. 5 is a flow diagram of an exemplary process for performing a data uniqueness check on a set of sorted data blocks in accordance with embodiments of the present invention.

FIG. 5 is a flow diagram of an exemplary computer controlled process 500 for performing a data uniqueness check on a set of sorted data blocks in accordance with embodiments of the present invention.

At step 502, embodiments of the present invention include accessing data to be inserted into a set of sorted data blocks. Any well known sorting technique may be used. In one embodiment of the invention, the set of sorted data blocks is a sorted hash cluster or a sorted range structure. In one embodiment of the invention, the data in the set of sorted data blocks is sorted according to a key and a queue ID.

At step 504, embodiments of the present invention include determining a proper data block of the set of sorted data blocks for which the data to be inserted should be located based on a first sorting key. For example, the first sorting key could be the name of a company.

At step 506, embodiments of the present invention include examining the proper data block for an existing data entry. If there is not an existing data entry, at step 508, embodiments of the present invention include inserting the data to be inserted in to the proper location of the set of sorted data blocks. If there is an existing entry, embodiments of the invention are continued in process 600 of FIG. 6.

Figure 6:
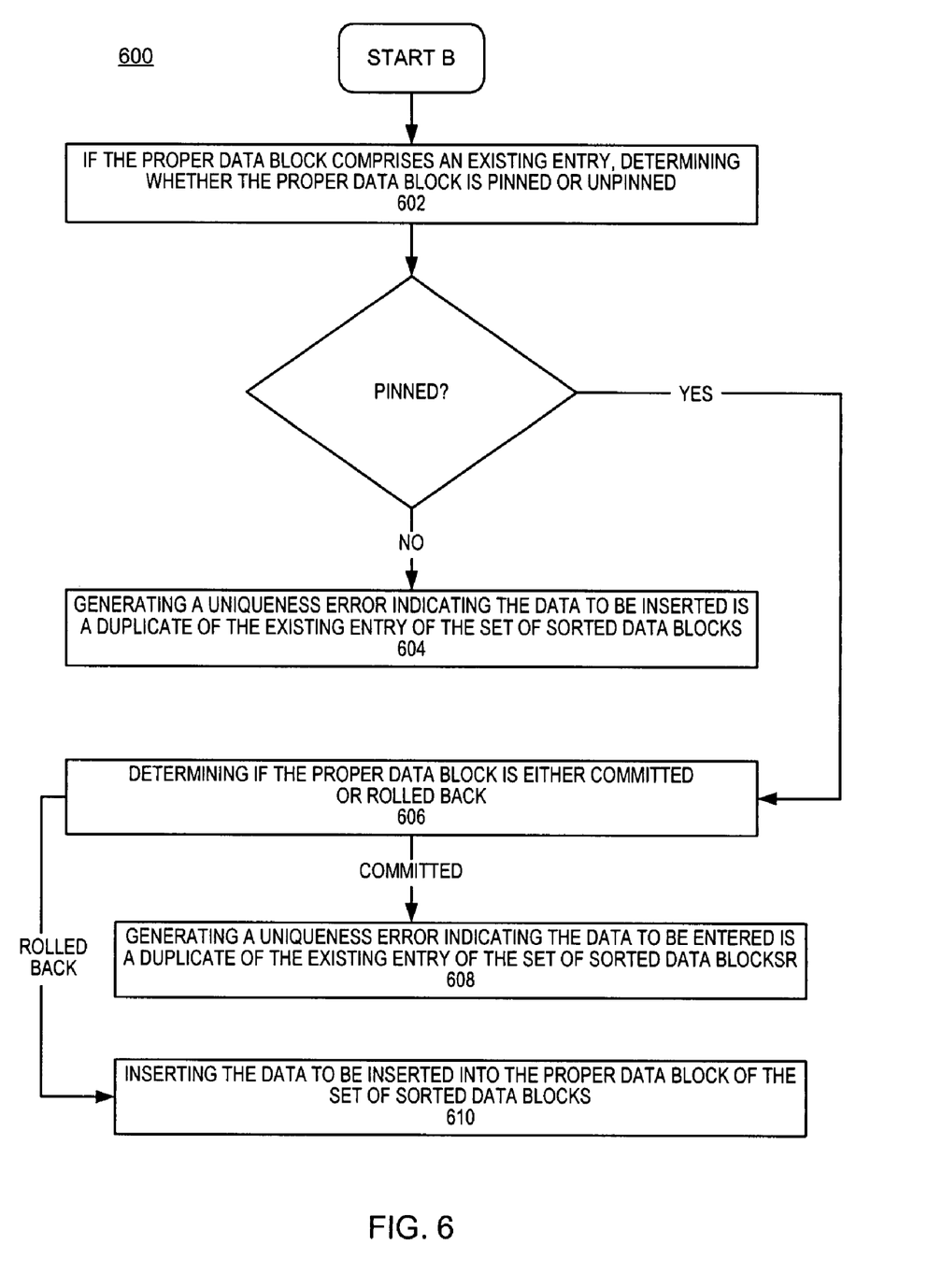
FIG. 6 is a flow diagram of an exemplary process for performing a data uniqueness check on a set of sorted data blocks including determining if a block is pinned in accordance with embodiments of the present invention.

FIG. 6 is a flow diagram of an exemplary computer controlled process 600 for performing a data uniqueness check on a set of sorted data blocks including determining if a block is pinned in accordance with embodiments of the present invention. In one embodiment of the invention, an existing data block in the proper location on the disk can be either pinned or unpinned. The block can be pinned, for example, by a process performing an operation on the block.

If the existing entry is not pinned, at step 604, embodiments of the present invention include generating a uniqueness error indicating that the data to be inserted is a duplicate of the existing entry of the set of sorted data blocks.

If the existing entry is pinned, at step 606, embodiments of the present invention include determining if the proper data block is either committed or rolled back. In one embodiment of the invention, a pinned block can be either rolled back or committed. For example, if a process is deleting the existing entry, the operation can be committed, meaning the existing block is deleted, or the operation can be rolled back, meaning the existing block is preserved (e.g., the deletion operation is un-done).

If the existing pinned block is committed, at step 608, embodiments of the present invention include generating a uniqueness error indicating the data to be entered is a duplicate of the existing entry of the set of sorted data blocks.

If the existing block is rolled back, at step 610, embodiments of the present invention include inserting the data into the proper location of the set of sorted data blocks.

Figure 7:
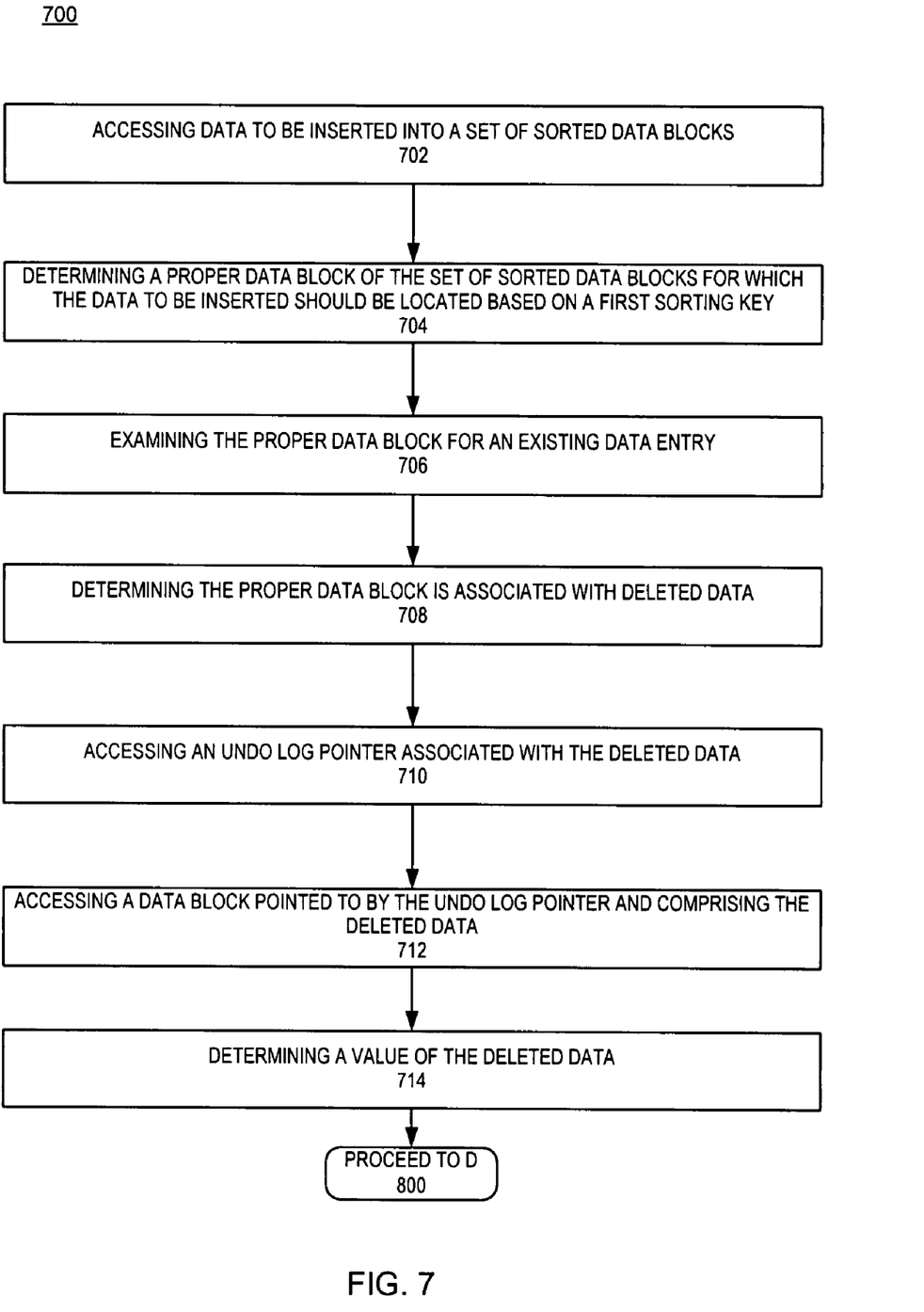
FIG. 7 is a flow diagram of an exemplary process for performing a data uniqueness check on a set of sorted data blocks including examining a data block pointed to by an undo log associated with deleted data in accordance with embodiments of the present invention.

FIG. 7 is a flow diagram of an exemplary computer implemented process 700 for performing a data uniqueness check on a set of sorted data blocks including examining a data block pointed to by an undo log associated with deleted data in accordance with embodiments of the present invention.

At step 702, embodiments of the present invention include accessing data to be inserted into a set of sorted data blocks. In one embodiment of the invention, the set of sorted data blocks is a sorted hash cluster or a sorted range structure. In one embodiment of the invention, the data in the set of sorted data blocks is sorted according to a key and a queue ID.

At step 704, embodiments of the present invention include determining a proper data block of the set of sorted data blocks for which the data to be inserted should be located based on a first sorting key. For example, the first sorting key could be the name of a company.

At step 706, embodiments of the present invention include examining the proper data block for an existing data entry. In one embodiment of the invention, in step 708, embodiments of the present invention include determining an existing entry of the proper location to put data to be inserted is marked as deleted.

At step 710, embodiments of the present invention include accessing an undo log data pointer associated with the deleted data. In one embodiment of the invention, the undo log data pointer points to the physical location on disk for which the deleted data is stored.

At step 712, embodiments of the present invention include accessing the data block that is pointed to by the undo log pointer. At step 714, embodiments of the present invention include determining a value of the deleted data. In one embodiment of the invention, the value is a key that can be used to sort the data.

Figure 8:
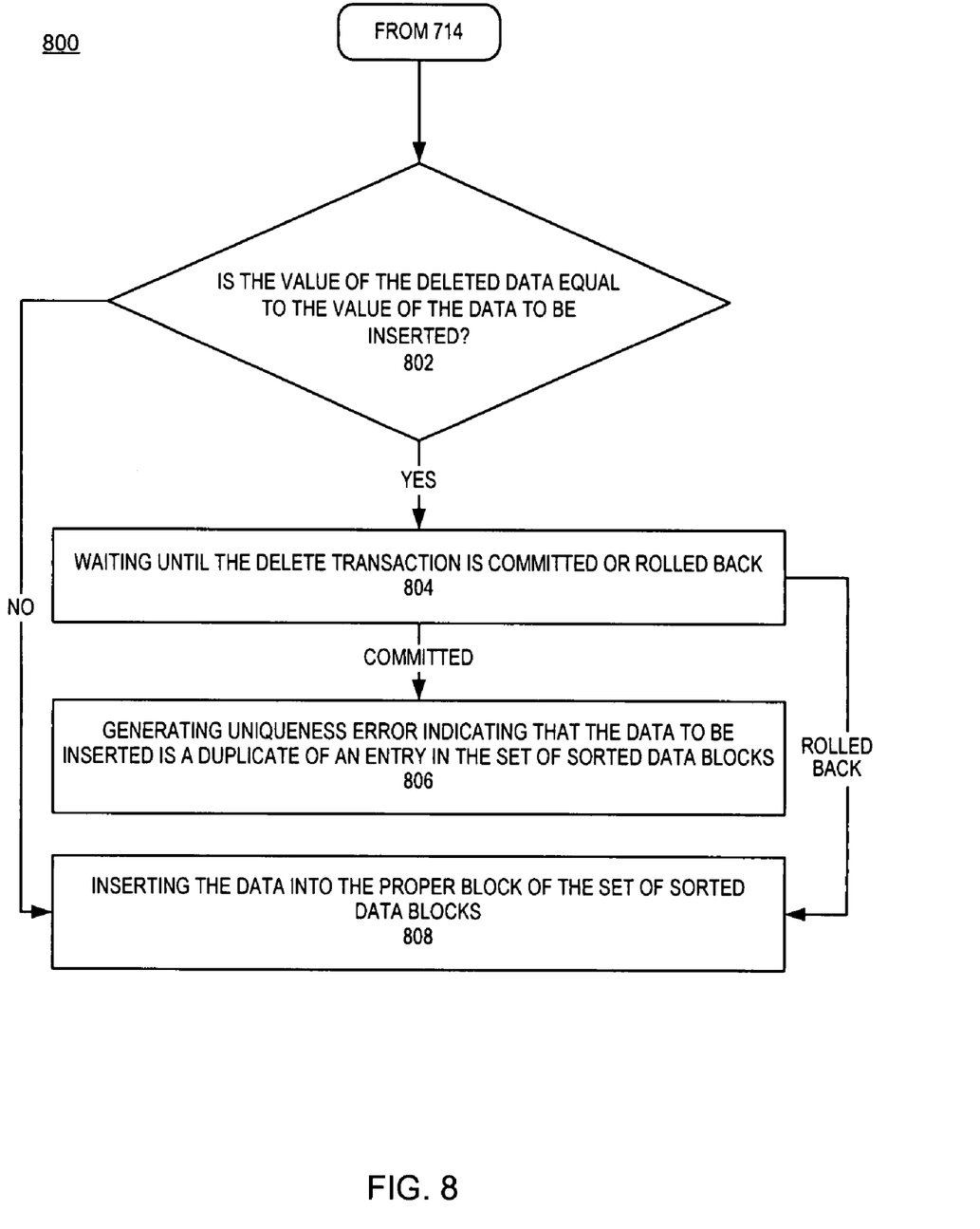
FIG. 8 is a flow diagram of an exemplary process for performing a data uniqueness check on a set of sorted data blocks including examining a value of deleted data in accordance with embodiments of the present invention.

FIG. 8 is a flow diagram of an exemplary computer controlled process 800 for performing a data uniqueness check on a set of sorted data blocks including examining a value of deleted data in accordance with embodiments of the present invention.

At step 802, embodiments of the present invention include determining if the value of the deleted data is equal to the value of the data to be inserted. As stated above, in one embodiment of the invention, it is determined if the deleted data comprises the same key as the data to be inserted.

If the value (e.g., key) of the deleted data is different from the value (e.g., key) of the data to be inserted, at step 808, embodiments of the present invention include inserting the data into the proper location of the set of sorted data blocks.

If the value (e.g., key) of the deleted data is equal to the value (e.g., key) of the data to be inserted, at step 804, embodiments of the present invention include waiting until the delete transaction is committed or rolled back. If the delete transaction is rolled back, at step 808, embodiments of the present invention include inserting the data into the proper location of the set of sorted data blocks.

If the delete transaction is committed, at step 806, embodiments of the present invention include generating a uniqueness error indicating that the data to be inserted is a duplicate of an entry in the set of sorted data blocks.

Exemplary Computer System

Figure 9:
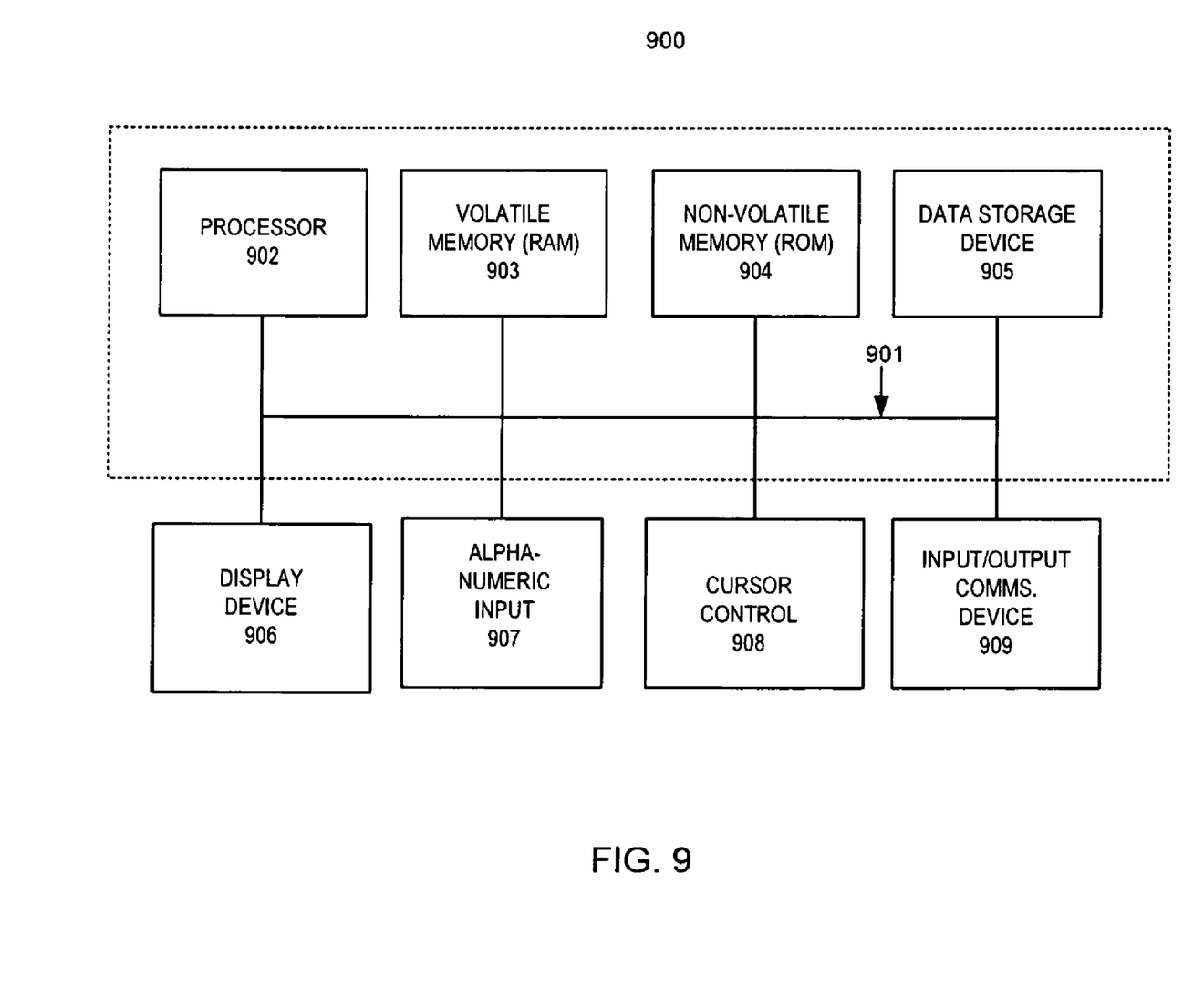
FIG. 9 is a block diagram of an exemplary computer system, which can be used as a platform for embodiments of the present invention.

With reference to FIG. 9, portions of the present invention are comprised of computer-readable and computer-executable instructions that may reside, for example, in computer system 900, which may be used as a part of a general-purpose computer network (not shown). It is appreciated that computer system 900 of FIG. 9 is exemplary only and that the present invention can operate within a number of different computer systems including general-purpose computer systems, embedded computer systems, laptop computer systems, hand-held computer systems, and stand-alone computer systems.

In the present embodiment, computer system 900 includes an address/data bus 901 for conveying digital information between the various components, a central processor unit (CPU) 902 for processing the digital information and instructions, a volatile main memory 903 comprised of volatile random access memory (RAM) for storing the digital information and instructions, and a non-volatile read only memory (ROM) 904 for storing information and instructions of a more permanent nature. In addition, computer system 900 may also include a data storage device 905 (e.g., a magnetic, optical, floppy, or tape drive or the like) for storing vast amounts of data. It should be noted that the software program for outputting information of the present invention can be stored either in volatile memory 903, data storage device 905, or in an external storage device (not shown).

Devices which are optionally coupled to computer system 900 include a display device 906 for displaying information to a computer user, an alpha-numeric input device 907 (e.g., a keyboard), and a cursor control device 908 (e.g., mouse, trackball, light pen, etc.) for inputting data, selections, updates, etc.

Furthermore, computer system 900 can include an input/output (I/O) signal unit (e.g., interface) 909 for interfacing with a peripheral device 910 (e.g., a printer, a computer network, modem, mass storage device, etc.). Accordingly, computer system 900 may be coupled in a network, such as a client/server environment, whereby a number of clients (e.g., personal computers, workstations, portable computers, minicomputers, terminals, etc.) are used to run processes for performing desired tasks (e.g., printing, outputting information, etc.).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for performing data uniqueness checking in sorted data sets, comprising:

storing sorted data blocks in a physical storage unit in a sorted layout structure;

accessing data for physical insertion in said physical storage unit;

determining a particular data block of said sorted data blocks in which to physically insert said accessed data in said physical storage unit using said sorted layout structure and a first sorting key;

examining said particular data block in said physical storage unit for presence of an existing data entry;

when said particular data block is empty, physically inserting said accessed data into said particular data block in said sorted layout structure of said physical storage unit;

when said particular data block comprises an existing entry, determining whether said particular data block in said sorted layout structure of said physical storage unit is pinned or unpinned; and in response to determining that said particular data block is unpinned, throwing an error indicating said accessed data is a duplicate of said existing entry of said sorted data blocks.

2. The method as recited in claim 1 further comprising:
in response to determining that said particular data block is pinned, determining if said particular data block is either committed or rolled back.

3. The method as recited in claim 2 further comprising:
in response to determining that said particular data block is committed, generating a uniqueness error indicating said accessed data is a duplicate of said sorted data blocks.

4. The method as recited in claim 2 further comprising:
in response to determining that said particular data block is rolled back, inserting said accessed data into said particular data block of said sorted data blocks.

5. The method as recited in claim 1 further comprising:
determining that said particular data block is associated with deleted data;
accessing an undo log pointer associated with said deleted data;
accessing a data block pointed to by said undo log pointer wherein said data block comprises said deleted data; and
determining a value of said deleted data.

6. The method as recited in claim 5 further comprising:
in response to determining that said value of said deleted data is different than a value of said accessed data, inserting said accessed data into said particular data block of said sorted data blocks.

7. The method as recited in claim 5 further comprising:
in response to determining that said value of said deleted data is equal to a value of said accessed data, determining whether said deleted data comprises said first sorting key.

8. The method as recited in claim 7 further comprising:
in response to determining that said deleted data comprises a second sorting key that is different from said first sorting key, inserting said accessed data into said particular data block of said sorted data blocks.

9. The method as recited in claim 1 wherein said stored data blocks comprise sorted hash clusters.

10. A computer system for performing data uniqueness checking in sorted data sets, comprising:
means for storing stored data blocks in said physical storage unit in a sorted layout structure;
means for accessing data for physical insertion in said physical storage unit;
means for determining a particular location in said sorted data blocks in which to physically insert said accessed data in said physical storage unit using said sorted layout structure and a first sorting key;
means for examining said particular location in said physical storage unit for presence of an existing entry;
means for physically inserting said accessed data in said particular location in said sorted layout structure of said physical storage unit; and
means for throwing an error in response to a determination by said means for examining said particular location that said particular data block comprises an existing entry and that said existing entry is unpinned.

11. The computer system as recited in claim 10 further comprising:
means for determining if an existing entry of said particular location is either pinned or unpinned.

12. The computer system as recited in claim 11 further comprising:
means for determining if a pinned data block is either committed or rolled back.

13. The computer system as recited in claim 10 wherein said sorted data blocks comprise sorted hash clusters.

14. The computer system as recited in claim 10 wherein said means for examining is configured to identify deleted data associated with said particular location in said sorted data blocks.

15. The computer system as recited in claim 14 further comprising:
means for accessing an undo log pointer associated with said deleted data.

16. The computer system as recited in claim 15 further comprising:
means for determining a value of said deleted data.

17. The computer system as recited in claim 16 further comprising:
means for comparing said value of said deleted data to a value of an existing entry of said particular location in said sorted data blocks.

18. The computer system as recited in claim 14 further comprising:
means for comparing a second sorting key associated with said deleted data to said first sorting key.

19. A computer readable storage medium comprising executable instructions stored therein which, when executed in a processing system, causes the system to implement a method of performing data uniqueness checking in sorted data sets, comprising:
instructions that cause the system to store sorted data blocks in a physical storage unit in a sorted layout structure;
instructions that cause the system to access data for physical insertion in said physical storage unit a particular data block of said sorted data blocks in which to physically insert said accessed data in said physical storage unit using said sorted layout structure and a first sorting key;
instructions that cause the system to examine said particular data block in said physical storage unit for presence of an existing data entry;
instructions that cause the system to, when said particular data block is empty, physically insert said accessed data into said particular data block in said sorted layout structure of said physical storage unit; and
instructions that cause the system to, when said particular data block comprises an existing entry, determine whether said particular data block in said sorted layout structure of said physical storage unit is pinned or unpinned; and
instructions that cause the system to, in response to determining that said particular data block is unpinned, throw an error indicating said accessed data is a duplicate of said existing entry of said sorted data blocks.

20. The computer readable storage medium as recited in claim 19 wherein said executable instructions further comprise:

instructions that cause the system to, in response to determining that said particular data block is pinned, determine if said particular data block is either committed or rolled back.

21. The computer readable storage medium as recited in claim 20 wherein said executable instructions further comprise:
   instructions that cause the system to, in response to determining that said particular data block is committed, generate a uniqueness error indicating said accessed data is a duplicate of said existing entry of said sorted data blocks.

22. The computer readable storage medium as recited in claim 20 wherein said executable instructions further comprise:
   instructions that cause the system to, in response to determining that said particular data block is rolled back, insert said accessed data into said particular data block of said sorted data blocks.

23. The computer readable storage medium as recited in claim 19 wherein said executable instructions further comprise:
   instructions that cause the system to determine that said particular data block is associated with deleted data;
   instructions that cause the system to access an undo log pointer associated with said deleted data;
   instructions that cause the system to access a data block pointed to by said undo log pointer wherein said data block comprises said deleted data; and
   instructions that cause the system to determine a value of said deleted data.

24. The computer readable storage medium as recited in claim 23 wherein said executable instructions further comprise:
   instructions that cause the system to, in response to determining that said value of said deleted data is different than a value of said accessed data, insert said accessed data into said particular data block of said sorted data blocks.

25. The computer readable storage medium as recited in claim 23 wherein said executable instructions further comprise:
   instructions that cause the system to, in response to determining that said value of said deleted data is equal to a value of said accessed data, determine whether said deleted data comprises said first sorting key.

26. The computer readable storage medium as recited in claim 25 wherein said executable instructions further comprise:
   instructions that cause the system to, in response to determining that said deleted data comprises a second sorting key that is different from said first sorting key, insert said accessed data into said particular data block of said sorted data blocks.

27. The computer readable storage medium as recited in claim 19 wherein said sorted data blocks comprise sorted hash clusters.

* * * * *

UNITED STATES PATENT AND TRADEMARK OFFICE
CERTIFICATE OF CORRECTION

PATENT NO.        : 7,752,181 B2                                       Page 1 of 1
APPLICATION NO.   : 10/984113
DATED             : July 6, 2010
INVENTOR(S)       : Jonathan Klein et al.

It is certified that error appears in the above-identified patent and that said Letters Patent is hereby corrected as shown below:

On sheet 2 of 9, in Figure 2, Box 206, line 1, delete "ASSESOR" and insert -- ACCESSOR --, therefor.

On sheet 6 of 9, in Figure 6, Box 608, line 2, delete "BLOCKSR" and insert -- BLOCKS --, therefor.

In column 2, line 3, delete "data be" and insert -- data to be --, therefor.

In column 3, line 56, delete "at" and insert -- of --, therefor.

In column 3, line 58, delete "though" and insert -- although --, therefor.

In column 4, line 32, delete "chan." and insert -- chain. --, therefor.

Signed and Sealed this
Third Day of May, 2011

David J. Kappos
*Director of the United States Patent and Trademark Office*